(12) United States Patent
Yamada et al.

(10) Patent No.: US 9,587,751 B2
(45) Date of Patent: Mar. 7, 2017

(54) FLOW CONTROL VALVES

(71) Applicant: AISAN KOGYO KABUSHIKI KAISHA, Obu-shi, Aichi-ken (JP)

(72) Inventors: Shigeki Yamada, Nagoya (JP); Hiroshi Fujiki, Kariya (JP)

(73) Assignee: AISAN KOGYO KABUSHIKI KAISHA, Obu-shi, Aichi-ken (JP)

( * ) Notice: Subject to any disclaimer, the term of this patent is extended or adjusted under 35 U.S.C. 154(b) by 197 days.

(21) Appl. No.: 14/132,305

(22) Filed: Dec. 18, 2013

(65) Prior Publication Data

US 2014/0182716 A1    Jul. 3, 2014

(30) Foreign Application Priority Data

Dec. 27, 2012   (JP) .................. 2012-284839

(51) Int. Cl.
*F16K 15/02*    (2006.01)
(52) U.S. Cl.
CPC ....... *F16K 15/026* (2013.01); *Y10T 137/7922* (2015.04)
(58) Field of Classification Search
CPC . F16K 15/0256; F16K 17/28; Y10T 137/7922
USPC ................................. 137/517, 460
See application file for complete search history.

(56) References Cited

U.S. PATENT DOCUMENTS

| 3,837,362 A * | 9/1974 | Barnes ..................... F15D 1/02 137/517 |
| 6,520,749 B2 | 2/2003 | Kimura et al. |
| 8,327,876 B2 | 12/2012 | Koyomogi |

FOREIGN PATENT DOCUMENTS

| CN | 101627241 A | 1/2010 |
| EP | 1186776 A2 | 3/2002 |
| JP | 49-56341 U | 8/1972 |
| JP | 61-147315 U | 9/1986 |
| JP | 62-96173 U | 6/1987 |
| JP | 63-74948 U | 5/1988 |
| JP | H10-9315 A | 1/1998 |
| JP | 2005-330898 A | 12/2005 |
| JP | 2012-163085 A | 8/2012 |

OTHER PUBLICATIONS

Translation of JP 61-147315 printed on Mar. 8, 2016 by USPTO Scientic and Technical Information Center (STIC).*

(Continued)

*Primary Examiner* — Kevin Lee
*Assistant Examiner* — P. Macade Nichols
(74) *Attorney, Agent, or Firm* — Conley Rose, P.C.

(57) ABSTRACT

An embodiment of a flow control valve includes a housing and a valve member. The valve member is movable in an axial direction within the housing, so that a flow rate of a fluid flowing within the housing changes in response to a position of the valve member within a control range in the axial direction. A spring device biases the valve member in the axial direction, so that the valve member moves in the axial direction against a biasing force of the spring device according to a difference in pressure on an upstream side and a downstream side of the valve member. The spring device includes a spring constant that changes according to the position of the valve member in the axial direction within the control range.

7 Claims, 7 Drawing Sheets

(56) References Cited

OTHER PUBLICATIONS

Journal of Technical Disclosure 99-6907, Oct. 1, 1999. Web address http://www6.ipdl.inpit.go.jp/Tokujitsu/tjcontentdb.ipdl.
Japanese Patent Application No. 2012-284839 Notification of Reasons for Rejection dated Jan. 26, 2016 (6 pages).
Chinese Patent Application No. 201310731055.5 Office Action dated Nov. 20, 2015 (18 pages).

\* cited by examiner

FLOW CONTROL VALVES

CROSS-REFERENCE TO RELATED APPLICATIONS

This application claims priority to Japanese patent application serial number 2012-284839, filed on Dec. 27, 2012, the contents of which are incorporated herein by reference in its entirety.

STATEMENT REGARDING FEDERALLY SPONSORED RESEARCH OR DEVELOPMENT

Not Applicable.

BACKGROUND

Field of the Technology

Embodiments of the present invention relate to flow control valves used for controlling the flow rate of fluids.

Description of the Related Art

In a blow-by gas refluxing system of an internal combustion engine of a vehicle, such as an automobile, there has been employed a positive crankcase ventilation (PCV) valve as a flow control valve for controlling the flow rate of blow-by gas.

A conventional example of the PCV valve (hereinafter referred to as "conventional example 1") will be described. FIG. 19 is a sectional view illustrating a PCV valve. As shown in FIG. 19, a PCV valve 140 is equipped with a tubular housing 142 having an inlet port 143 and an outlet port 144, a valve member 146 arranged inside the housing 142 so as to be capable of moving forward and rearward in the axial direction, and a spring 166 including of a coil spring configured to bias the valve member 146 toward the inlet port 143 (to the right as seen in FIG. 19). A seat 150 having a monitoring hole portion 151 of a predetermined inner diameter is installed inside the housing 142. The valve member 146 is equipped with a base shaft portion 159 and a monitoring shaft portion 160 continuous with the leading end side portion of the base shaft portion 159. The monitoring shaft portion 160 coaxially includes a small-diameter shaft portion 163 on the leading end side, a large-diameter shaft portion 164 on the base end side, and a tapered portion 165 having a diameter increasing from the small-diameter shaft portion 163 side toward the large-diameter shaft portion 164 side. The tapered portion 165 has a predetermined tapering angle $\theta 1$. The monitoring shaft portion 160 of the valve member 146 is inserted into the monitoring hole portion 151 of the seat 150. At the base end portion of the valve member 146, there is provided a flange-like guide portion 161. The spring 146 is interposed between the seat 150 of the housing 142 and the guide portion 161 of the valve member 146.

In the above-described PCV valve 140, when the intake negative pressure is introduced into the housing 142 from the outlet port 144 side, the valve member 146 moves toward the outlet port 144 side (to the left as seen in FIG. 19) against the biasing force of the spring 166 in accordance with the difference between the upstream side pressure and the downstream side pressure. As a result, the flow rate of the blow-by gas flowing through an annular opening defined between the circumferential wall of the monitoring hole portion 151 of the housing 142 and the monitoring shaft portion 160 of the valve member 146 is controlled, that is, monitored. PCV valves of a structure similar to that of conventional example 1 are disclosed, for example, in JP-A-2005-330898 and JP-A-2012-163085.

According to conventional example 1 described above, a coil spring of a fixed spring constant is employed as the spring 166. Further, there is a demand for an increase in the flow rate of the blow-by gas in the wide open throttle (WOT) range of the engine. Thus, as the diameter of the small-diameter shaft portion 163 of the monitoring shaft portion 160 of the valve member 146 is reduced, the tapering angle $\theta 1$ of the tapered portion 165 increases (that is, the tapering becomes steeper). In the valve member 146 having the tapered portion 165 with a steep tapering angle $\theta 1$, the change in flow rate with respect to the distance of movement of the valve member 146 is large in the movement range for monitoring the flow between the monitoring hole portion 151 and the tapered portion 165. In this way, self-excited oscillation is likely to be generated which may lead the flow rate characteristics to become unstable.

A modification (hereinafter referred to as "conventional example 2") of conventional example 1 described above will be described. FIG. 20 is a sectional view illustrating a PCV valve. The portions of conventional example 2 corresponding to those of conventional example 1 are indicated by the same reference numerals with symbol A added thereto. As shown in FIG. 20, by setting a tapering angle $\theta 2$ of a tapered portion 165A of a valve member 146A to a small angle (i.e., a gentle angle), it might be possible to suppress the self-excited oscillation of the valve member 146A, and to stabilize the flow rate characteristics. However, setting the tapered portion 165A to have the gentle tapering angle $\theta 2$ may lead to an increase in the axial length of the tapered portion 165A and an increase in the axial length of the large-diameter shaft portion 164A. As a result, the axial length of the valve member 165A as a whole may increase, and, further, the axial length of the housing 142A may increase. Further, this will result in an increase in the movement range or the stroke amount of the valve member 146A, and it is necessary to increase the spring length (axial length) of the spring 166A and to reduce the spring constant thereof. Thus, the size of the PCV valve 140A may inevitably increase.

With the arrangements of conventional examples 1 and 2 described above, it is difficult to achieve both the stabilization of the flow rate characteristics of the PCV valve and the suppression of an increase in the size thereof. This would restrict the degree of freedom in terms of design to a rather low level. Further, the PCV valves as disclosed in JP-A-2005-330898 and JP-A-2012-163085 also involve the same problem as that in conventional example 1. In the case of JP-A-2012-163085, there is provided, in the downstream portion within the housing, a restricting spring for restricting excessive movement of the valve member toward the downstream side. However, the restricting spring is a spring configured to act when the valve member has moved excessively downstream beyond the movement range used for monitoring. In other words, it is not a spring related to the monitoring function.

Therefore, there has been a need in the art for flow control valves that are improved in terms of freedom in design.

SUMMARY OF THE DISCLOSURE

An embodiment of a flow control valve may include a housing and a valve member. The valve member is movable in an axial direction within the housing, so that a flow rate of a fluid flowing within the housing changes in response to a position of the valve member within a control range in the axial direction. A spring device may bias the valve member in the axial direction, so that the valve member moves in the axial direction against a biasing force of the spring device according to a difference in pressure on an upstream side and a downstream side of the valve member. The spring device may have a spring constant that changes according to the position of the valve member in the axial direction within the control range.

DETAILED DESCRIPTION

Figure 1:
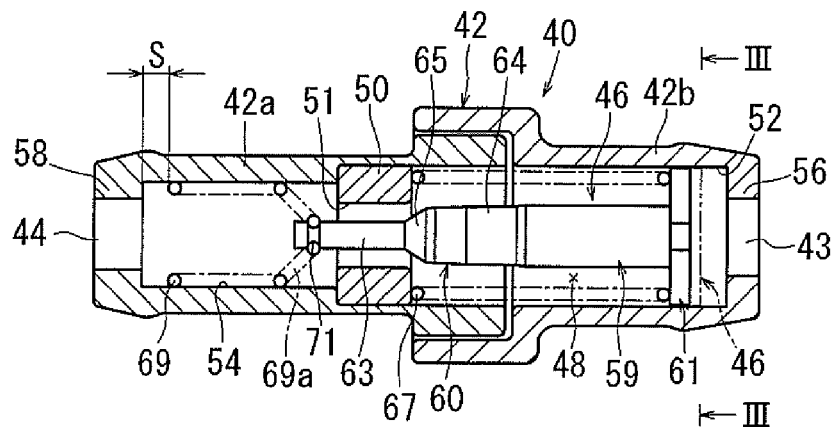
FIG. 1 is a sectional view illustrating a PCV valve according to an embodiment in accordance with the principle disclosed herein.
Figure 2:
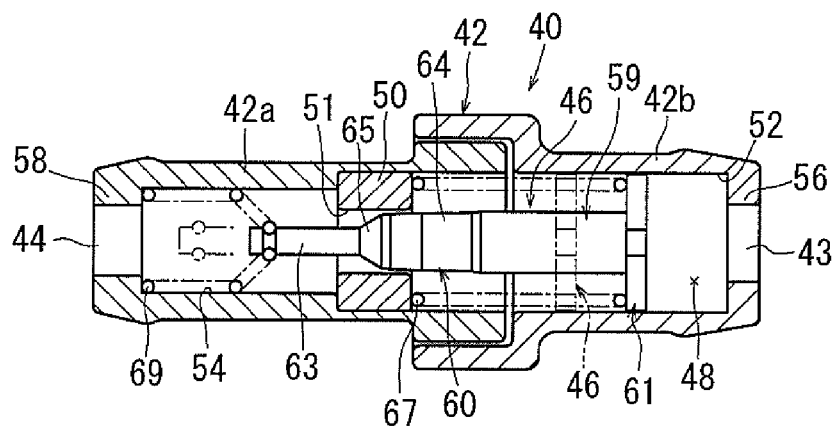
FIG. 2 is a sectional view illustrating the PCV valve of FIG. 1, with its first and second springs in a state of action.

Each of the additional features and teachings disclosed above and below may be utilized separately or in conjunction with other features and teachings to provide improved flow control valves. Representative examples, which utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the disclosure. Only the claims define the scope of the claimed invention. Therefore, combinations of features and steps disclosed in the following detailed description may not be necessary to practice the claimed invention in the broadest sense, and are instead included merely to particularly describe representative examples. Moreover, various features of the representative examples and the dependent claims may be combined in ways that are not specifically enumerated in order to provide additional useful examples of the present teachings.

In one embodiment, a flow control valve may include a housing having an inlet port and an outlet port, a valve member movable in an axial direction within the housing, and a spring device configured to bias the valve member toward the side of the inlet port. A monitoring hole portion may be disposed within the housing. The valve member may have a base shaft portion and a monitoring shaft portion. With the monitoring shaft portion positioned within the monitoring hole portion, the valve member may move in the axial direction within the housing in response to a difference in pressure between an upstream side and a downstream side of the valve member within the housing in order to monitor a flow rate of a fluid flowing from the inlet port to the outlet port. The spring device may include a plurality of springs configured such that a spring constant of the spring device changes in a movement range of the valve member for a monitoring operation.

With this arrangement, because the spring constant of the spring device changes in the movement range of the valve member for the monitoring operation, it is possible to give freedom in design to the flow control valve. The flow control valve may be a PCV valve used in a blow-by gas refluxing system of an internal combustion engine.

The spring constant of the spring device may have such a non-linear characteristic that the spring constant increases according to a movement distance of the valve member from an initial position for the monitoring operation.

The plurality of springs may include a first spring biasing the valve member throughout the entire movement range of the valve member and a second spring biasing the valve member when a movement distance from an initial position of the valve member is relatively large. With this arrangement, both of the first and second springs may apply biasing forces to the valve member if the movement distance from the initial position of the valve member is relatively large. Therefore, it is possible to set the spring constant of the spring device to have a large value (i.e., the sum of the spring constant of the first spring and the spring constant of the second spring). Hence, it is possible to minimize the axial lengths of the housing and the valve member to eventually downsize the flow control valve. In addition, because only the first spring applies the biasing force if the movement distance from the initial position of the valve member is relatively short, it is possible to set the spring constant of the spring device to have a small value.

The monitoring shaft portion of the valve member may include a tapered portion positioned within the monitoring hole portion when the valve member is in a part of the movement range. In such a configuration, it is preferred that the first spring member biases the valve member while the second spring member does not bias the valve member. The tapered portion may have a first end on the side of the inlet port and a second port on the side of the outlet port. The diameter of the first end may be larger than that of the second end. With this arrangement, by setting the tapering angle of the tapered portion to be small, it is possible to suppress any self-excited oscillation of the valve member where only the first spring member biases the valve member. This makes it possible to stabilize the flow rate characteristic of the fluid.

In one example, the first spring may be interposed between the housing and the valve member at a position on an upstream side within the housing. The second spring may be interposed between the housing and the valve member at a position on a downstream side within the housing, while a gap is formed between the second spring and at least one of the housing and the valve member. The second spring may act with the valve member when the valve member is in a first part of the movement range for the monitoring operation. Here, a moving distance of the valve member from the initial position exceeds a length of the gap in the axial directions. It is possible that the second spring may not act with the valve member when the valve member is in a second part of the movement range for the monitoring operation. Here, the moving distance of the valve member from the initial position does not exceed the length of the gap.

The second spring may be connected to the valve member, so that the second spring can move together with the valve member. A spring constant of the first spring may be smaller than a spring constant of the second spring. Each of the first spring and the second spring may be a single coil spring.

In another example, the first spring may be interposed between the housing and the valve member at a position on an upstream side within the housing. An interlock member may be disposed on a downstream side within the housing so as to be movable in the axial direction. The second spring may be interposed between the housing and the interlock member. A gap may be formed between the valve member and the interlock member when the valve member is positioned at the initial position for the monitoring operation. The second spring may act with the valve member via the interlock member when the valve member is in a first part of the movement range for the monitoring operation. Here, a moving distance of the valve member from the initial position exceeds a length of the gap in the axial direction. The second spring may not act with the valve member via the interlock member when the valve member is in a second part of the movement range for the monitoring operation. Here, the moving distance of the valve member from the initial position does not exceed the length of the gap.

In a further example, the first spring may be interposed between the housing and the valve member at a position on an upstream side within the housing, and the second spring may be interposed between the housing and the valve member at a position on a downstream side within the housing. A gap may be formed between the second spring and at least one of the housing and the valve member. One of the first spring and the second spring is preferably disposed on a radially outer side or a radially inner side of the other of the first spring and the second spring. The second spring may act with the valve member when the valve member is in a first part of the movement range for the monitoring operation. Here, a moving distance of the valve member from the initial position exceeds a length of the gap in the axial direction. It is possible that the second spring may not act with the valve member when the valve member is in a second part of the movement range for the monitoring operation. Here, the moving distance of the valve member from the initial position does not exceed the length of the gap.

An embodiment will be described with reference to FIGS. 1 to 6. In this embodiment, a PCV valve used in a blow-by gas refluxing system of an internal combustion engine will be described as an example of a flow control valve. For the sake of convenience in illustration, an example of a blow-by gas refluxing system will be first described before describing the PCV valve. FIG. 6 is a schematic diagram illustrating the positive crankcase ventilation system.

As shown in FIG. 6, in a blow-by gas refluxing system 10, blow-by gas leaked from a combustion chamber (not shown) of an engine main body 13 of an internal combustion engine 12 may flow into a crankcase 15 of a cylinder block 14 and may be introduced into an intake manifold 20. In this way, the blow-by gas may again be combusted in the combustion chamber.

The engine main body 13 may include the cylinder block 14, an oil pan 16 fastened to the lower surface side of the crankcase 15, a cylinder head 17 fastened to the upper surface side of the cylinder block 14, and a cylinder head cover 18 fastened to the upper surface side of the cylinder head 17. The engine main body 13 may generate a drive force through the steps of intake, compression, explosion, and exhaust in a known manner. With the combustion in the combustion chamber (not shown) of the engine main body 13, blow-by gas may be generated in the engine main body 13, i.e., in the crankcase 15 thereof, and in the cylinder head cover 18 communicating with the crankcase 15. The interior of the cylinder head cover 18, the crankcase 15, etc., into which the blow-by gas flows will be hereinafter referred to as "the interior of the engine main body".

The cylinder head cover 18 is provided with a fresh air introduction port 18a and a blow-by gas extraction port 18b. The fresh air introduction port 18a communicates with one end (downstream end) of a fresh air introduction passage 30. Further, the blow-by gas extraction port 18b communicates with one end (upstream end) of a blow-by gas passage 36. Instead of being provided on the cylinder head cover 18, the fresh air introduction port 18a and/or the blow-by gas extraction port 18b may be provided on the crankcase 15.

The cylinder head 17 may communicate with one end (downstream end) of the intake manifold 20. The intake manifold 20 may include a surge tank 21. The other end (upstream end) of the intake manifold 20 may communicate with an air cleaner 25 via a throttle body 24 and an intake conduit line 23. The throttle body 24 may include a throttle valve 24a. The throttle valve 24a may be connected, for example, to an accelerator pedal (not shown), and may be opened and closed according to the stepping amount (operation amount) of the pedal. The air cleaner 25 serves to introduce air or so-called fresh air, and may include a filter element 26 configured to filter the fresh air. The air cleaner 25, the intake conduit line 23, the throttle body 24, and the intake manifold 20 may constitute an intake path 27 for introducing fresh air, i.e., intake air, into the combustion chamber of the engine main body 13. A portion of the intake path 27 on the upstream side of the throttle valve 24a will be referred to as an upstream side intake path portion 27a, and portion of the intake path 27 on the downstream side of the throttle valve 24a will be referred to as a downstream side intake path portion 27b.

The intake conduit line 23 may have a fresh air intake port 29. The fresh air intake port 29 may communicate with the other end (upstream end) of the fresh air introduction path 30. The fresh air introduction path 30 may have a back-flow preventing valve 32. The back-flow preventing valve 32 may allow flow of air, i.e., so-called fresh air, into the crankcase 15 from the upstream side intake path portion 27a (see arrow Y1 in FIG. 6), while preventing flow in the reverse direction, i.e., backflow (see arrow Y3 in FIG. 6). The surge tank 21 may include a blow-by gas introduction port 34. The blow-by gas introduction port 34 may communicate with the other end (downstream end) of the blow-by gas passage 36. The back-flow valve 32 may be provided as needed.

Next, the operation of the blow-by gas refluxing system 10 will be described. When the load of the engine 12 is low or medium, the throttle valve 24a is substantially at or at a fully closed position. As a result, there is generated a higher intake negative pressure (intake negative pressure increasing on the vacuum side) in the downstream side intake path portion 27b of the intake path 27 than in the upstream side intake path portion 27a. Thus, the blow-by gas in the engine main body 13 is introduced into the downstream side intake path portion 27b through the blow-by gas passage 36 (See arrow Y2 in FIG. 6). The flow rate of the blow-by gas flowing through the blow-by gas passage 36 may be controlled, i.e., monitored, by a PCV valve 40 that will be described later.

The back-flow valve 32 may be opened as blow-by gas is introduced from within the engine main body 13 into the downstream side intake path portion 27b via the blow-by gas passage 36. As a result, the fresh air in the upstream side intake path portion 27a of the intake path 27 may be introduced into the engine main body 13 through the fresh air introduction passage 30 (see arrow Y1 in FIG. 6). The fresh air introduced into the engine main body 13 may flow into the downstream side intake path portion 27b through the blow-by gas passage 36 together with the blow-by gas (see arrow Y2 in FIG. 6). In this way, the interior of the engine main body 13 may be scavenged.

When the engine 12 is under high load, the opening amount of the throttle valve 24a may be relatively large. Thus, the pressure of the downstream side intake path portion 27b of the intake path 27 may approach that of the atmospheric pressure. Accordingly, it becomes difficult for the blow-by gas in the engine main body 13 to be introduced into the downstream side intake path portion 27b, and the pressure in the engine main body 13 may also approach that of the atmospheric pressure. As a result, the flow rate of fresh air introduced into the engine main body 13 from the upstream side intake path portion 27a through the fresh air introduction passage 30 may decrease. Further, due to the closing of the back-flow preventing valve 32, potential back-flow of the blow-by gas from within the engine main body 13 into the fresh air introduction passage 30 (see arrow Y3 in FIG. 6) may be prevented.

The PCV valve 40 may be provided in the blow-by gas passage 36 and the PCV valve 40 may serve as a flow control valve for controlling the flow rate of the blow-by gas. The PCV valve 40 may control, i.e., monitor the flow rate of the blow-by gas according to the difference between the upstream side pressure and the downstream side pressure, i.e., according to the intake negative pressure (also referred to as a "boost pressure"). As a result, the blow-by gas may flow to the downstream side intake path portion 27b at a flow rate determined according to the amount of blow-by gas generated in the engine 12.

Next, the PCV valve 40 will now be described with reference to FIGS. 1 to 4. For the purpose of explanation, the left-hand side as seen in FIG. 1 will be referred to as the front side, and the right-hand side will be referred to as the rear side.

As shown in FIG. 1, the PCV valve 40 may include a hollow tubular housing 42 having an inlet port 43 and an outlet port 44, and a valve member 46 accommodated in the housing 42 so as to be capable of moving forward and rearward in the axial direction of the housing 42. The hollow portion inside the housing 42 may serve as a gas passage 48 extending in the axial direction (the left and right direction in FIG. 1). The rear end portion (the right end portion in FIG. 1) of the housing 42 is connected to the upstream side passage portion of the blow-by gas passage 36 (see FIG. 6). The front end portion (the left end portion in FIG. 1) of the housing 42 is connected to the downstream side passage portion of the blow-by gas path 36. In some cases, the rear end portion of the housing 42 may be connected to the blow-by gas extraction port 18b of the cylinder head cover 18 (see FIG. 6).

The housing 42 may include a pair of front and rear housing halves 42a and 42b, respectively, that are disposed on the front side and the rear side, respectively, in the axial direction (forward and rearward direction) and are joined to each other to form the housing 42. Both housing halves 42a and 42b may be made, for example, of resin. A cylindrical tubular seat 50 may be coaxially arranged in the central portion of the front side housing half 42a. A monitoring hole portion 51 may be defined by a central hole of the seat 50. Further, a hollow, cylindrical upstream side passage wall surface 52 may be formed in the rear side housing half 42b, that is, on the gas inflow side (the right-hand side in FIG. 1) of the gas passage 48. Further, a hollow, cylindrical downstream side passage wall surface 54 may be formed in the front side housing half 42a, that is, on the gas outflow side (the left-hand side in FIG. 1) on the front side of the seat 50.

At the rear end portion of the rear side housing half 42b, there is formed a rear end wall portion 56 protruding in a flange-like fashion radially inwards from the upstream side passage wall surface 52. The inlet port 43 may be defined by a circular hole portion of the rear end wall portion 56. Further, at the front end portion of the front side housing half 42a, there is formed a front end wall portion 58 protruding in a flange-like fashion radially inwards from the passage wall surface 54. The outlet port 44 may be defined by a circular hole of the front end wall portion 58.

Figure 4:
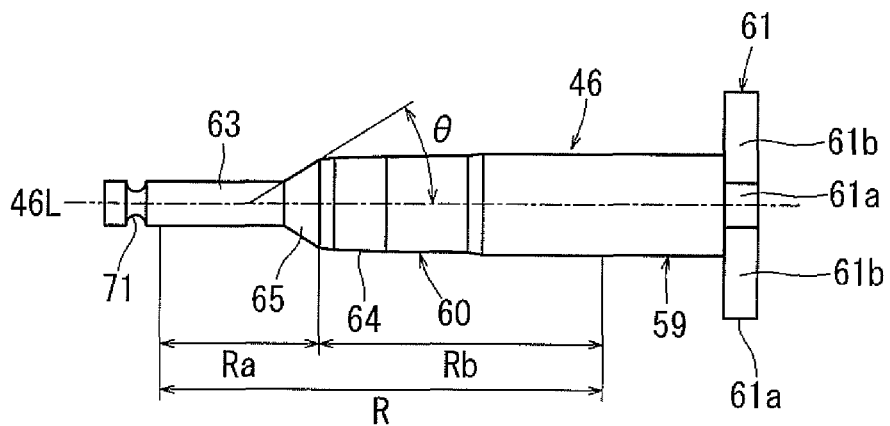
FIG. 4 is a side view of a valve member in accordance with the principles disclosed herein.

The valve member 46 may be made, for example, of resin. As shown in FIG. 4, the valve member 46 may have a base shaft portion 59, a monitoring shaft portion 60 continuous with the leading end portion (front end portion) of the base shaft portion 59, and a flange-like guide portion 61 formed at the base end portion (rear end portion) of the base shaft portion 59. The monitoring shaft portion 60 may be formed as a tapered stepped shaft, and may include a small-diameter shaft portion 63 on the leading end side, a large-diameter shaft portion 64 having a larger outer diameter than the small-diameter shaft portion 63, and a tapered portion 65 positioned between the small-diameter shaft portion 63 and the large-diameter shaft portion 64. The tapered portion 65 preferably has a diameter gradually increasing from the small diameter side toward the large diameter side (or from the small-diameter shaft portion 63 to the large-diameter shaft portion 64). The tapered portion 65 may be formed to have a predetermined tapering angle $\theta$. The tapering angle $\theta$ is an angle between an axis 46L of the valve member 46 and the outer peripheral surface of the tapered portion 65. The large-diameter shaft portion 64 may have at least one or more stepped surfaces and/or tapered surfaces that may cause a negligible change in the outer diameter of the large-diameter shaft portion 64. The base end portion of the large-diameter shaft portion 64 may have a same outer diameter as the base shaft portion 59.

As shown in FIG. 1, the monitoring shaft portion 60 may be inserted into the monitoring hole portion 51 of the housing 42 from the inlet port 43 side toward the outlet port 44 side. Thus, as the valve member 46 moves rearward (i.e., moves to the right in FIG. 1), the sectional area (flow passage sectional area) of the annular opening defined between the monitoring hole portion 51 and the monitoring shaft portion 60 may increase. Conversely, as the valve member 46 moves forward (i.e., moves to the left in FIG. 1), the flow passage sectional area between the measurement hole portion 51 and the measurement shaft portion 60 may be reduced. That is, as the monitoring shaft portion 60 of the valve member 46 moves in the forward and rearward direction with respect to the monitoring hole portion 51 of the housing 42, the flow rate of the blow-by gas flowing through the opening between the measurement hole portion 51 and the monitoring shaft portion 60 may be controlled (monitored).

Within the movement range between the rearmost position and the foremost position of the valve member 46 for the monitoring operation, the monitoring shaft portion 60 of the valve member 46 may oppose the inner circumferential wall of the monitoring hole portion 51 in the radial direction. This movement range of the monitoring shaft portion 60 of the valve member 60 is indicated by symbol R in FIG. 4. Further, the operational range of the small-diameter shaft portion 63 and the tapered portion 65 of the monitoring shaft portion 60 is indicated by symbol Ra in FIG. 4. The operational range of the large-diameter shaft portion 64 of the measurement shaft portion 60 is indicated by symbol Rb in FIG. 4. Further, the boundary between the base shaft portion 59 and the monitoring shaft portion 60 may be set at the rear end position of the movement range R. Thus, the base shaft portion 59 and the front end portion of the small-diameter shaft portion 63 may not be used for the monitoring or flow controlling operation.

Figure 3:
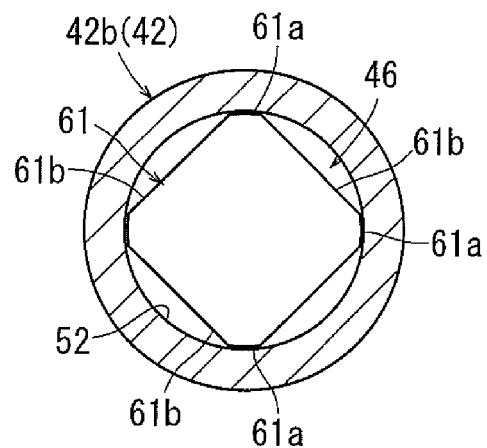
FIG. 3 is a sectional view taken along the arrow line III-III of FIG. 1.

As shown in FIG. 3, on the outer peripheral surface of the guide portion 61, there are formed a plurality of flat cutout surfaces 61b at equal intervals in the circumferential direction. The portions between the adjacent cutout surfaces 61b are formed as arcuate surfaces 61a. The arcuate surfaces 61a may be slidably fitted into the upstream side passage wall surface 52 of the housing 42. Between the cutout surfaces 61b and the upstream side passage wall surface 52, there are formed D-shaped openings as flow passages through which the blow-by gas flows.

As shown in FIG. 1, inside the upstream side passage portion of the gas passage 48 of the housing 42, a single first spring 67 may be disposed between the housing 42 and the valve member 46. The first spring 67 may be a cylindrical coil spring. The first spring 67 may be fitted over the shaft-like portion of the valve member 46 (the base shaft portion 59 and the monitoring shaft portion 60). The first spring 67 may further be interposed between the surface of the seat 50 of the housing 42 and the surface of the guide portion 61 of the valve member 46 in the axial direction. The first spring 67 may normally bias the valve member 46 toward the inlet port 43 side. The first spring 67 may act throughout the entire movement range of the valve member 46 for the monitoring operation. In FIG. 1, the initial position of the valve member 46 for the monitoring operation is indicated by the chain double-dashed line.

A single second spring 69 may be disposed inside of the downstream side passage portion of the gas path 48 of the housing 42. The second spring 69 may be a pitch coil spring of a cylindrical configuration or the like having a pigtail end portion 69a. The pigtail end portion 69a is positioned on the side of the seat 50. An annular mounting groove 71 may be formed in the leading end portion of the small-diameter shaft portion 63 of the monitoring shaft portion 60 of the valve member 46 (see FIG. 4). The small-diameter side terminal portion of the pigtail end portion 69a of the second spring 69 may be attached to the mounting groove 71 by utilizing elastic deformation thereof. In this way, the second spring 69 is in communication with the valve member 46, so that the valve member 46 and the second spring 69 can move together with each other. Further, a predetermined axial gap S may be provided between the surface of the front end wall portion 58 of the housing 42 and the surface of the second spring 69 opposed thereto in the axial direction (See FIG. 1). As a result, the second spring 69 may not act within a movement range of the valve member 46, in which the movement distance of the valve member 46 from the initial position for the monitoring operation (See the chain double-dashed line 46 in FIG. 1) is smaller than the gap S. The second spring 69 may act within a movement range of the valve member 46, in which the movement distance of the valve member 46 from the initial position for the monitoring operation is larger than the gap S. In this movement range, the second spring 69 biases the valve member 46 toward the inlet port 43 side. Both the first spring 67 and the second spring 69 may have linear characteristics.

Next, the operation of the PCV valve 40 (see FIG. 1) will be described. While the engine 12 (See FIG. 6) is at rest, no intake negative pressure (boost pressure) is generated in the intake path 27. Thus, the valve member 46 is biased by the elasticity of the first spring 67 so as to be brought to a fully open state (see the chain double-dashed line 46 in FIG. 1) in which the guide portion 61 is close to the rear end wall portion 56. In this state, the second spring 69 is spaced away from the front end wall portion 58 of the housing 42 by the gap S. The fully open position of the valve member 46 will be hereinafter also called an "initial position".

When the engine 12 is started, the intake negative pressure of the intake path 27 is introduced into the interior of the housing 42, i.e., into the gas passage 48, via the outlet port 44. As a result, due to the action of the intake negative pressure, the valve member 46 may move toward the outlet port 44 side against the biasing force of the first spring 67. Further, with the movement of the valve member 46, the second spring 69 may be brought into contact with the front end wall portion 58 of the housing 42, whereby the second spring 69 may act. Therefore, the valve member 46 may move toward the outlet port 44 side against the biasing forces of the first spring 67 and the second spring 69. That is, when the load of the engine 12 is low, the opening amount of the throttle valve 24a of the throttle body 24 (see FIG. 6) is small, and the intake negative pressure generated in the intake path 27 is high. As a result, the valve member 46 may move toward the outlet port 44 side by the intake negative pressure (see the chain double-dashed line 46 in FIG. 2). Therefore, the large-diameter side shaft portion of the large-diameter shaft portion 64 of the valve member 46 may be brought to be positioned within the monitoring hole portion 51 of the housing 42. In other words, the large-diameter side shaft portion may be brought to oppose to the inner circumferential wall of the monitoring hole portion 51 in the radial direction. As a result, the flow passage sectional area of the opening between the inner circumferential wall of the monitoring hole portion 51 and the monitoring shaft portion 60 may be reduced, and the flow rate of the blow-by gas flowing through the PCV valve 40 may be low. The movement range of the valve member 46 during the low load operation may correspond to the idling range of the engine 12 (see FIG. 6).

During the middle load operation of the engine 12, the opening amount of the throttle valve 24a of the throttle body 24 (See FIG. 6) may be large in comparison to the opening amount during the low load operation. Further, the intake negative pressure generated in the intake path 27 may be decreased. Thus, the valve member 46 may move toward the inlet port 43 by the biasing forces of the first spring 67 and the second spring 69 (see the solid lines in FIG. 2). Therefore, the small-diameter side shaft portion of the large-diameter shaft portion 64 of the valve member 46 may be brought to be positioned within the monitoring hole portion 51 of the housing 42. Thus, the flow passage sectional area of the opening between the inner circumferential wall of the monitoring hole portion 51 and the monitoring shaft portion 60 may increase, and the flow rate of the blow-by gas flowing through the PCV valve 40 may increase as compared to that in the case of the low load operation. The movement range of the valve member 46 during the middle load operation may correspond to a partial load range of the engine 12 (see FIG. 6).

During the high load operation of the engine 12, the opening amount of the throttle valve 24a of the throttle body 24 (See FIG. 6) may be larger than in comparison to the opening amount during the middle load operation, and the intake negative pressure generated in the intake path 27 may be further decreased. Thus, with the movement of the valve member 46, the second spring 69 may move away from the front end wall portion 58 of the housing 42, so that the valve member 46 may be moved toward the inlet port 43 due to the biasing force of the first spring 67 only (see FIG. 1). Therefore, the tapered portion 65 of the monitoring shaft portion 60 of the valve member 46 (inclusive of the small-diameter shaft portion 63) may be brought to be positioned within the measurement hole portion 51 of the housing 42. As a result, the flow passage sectional area of the opening between the inner circumferential wall of the monitoring hole portion 51 and the tapered portion 65 (inclusive of the small-diameter shaft portion 63) may increase, and the flow rate of the blow-by gas flowing through the PCV valve 40 may increase as compared to that during the middle load operation. The movement range of the valve member 46 during the high load operation may correspond to the WOT range of the engine 12 (see FIG. 12). The gap S between the front end wall portion 58 of the housing 42 and the second spring 69 may correspond to the movement range of the valve member 46 in which the tapered portion 65 (inclusive of the small-diameter shaft portion 63) of the monitoring shaft portion 60 is positioned within the measurement hole portion 51.

Figure 5:
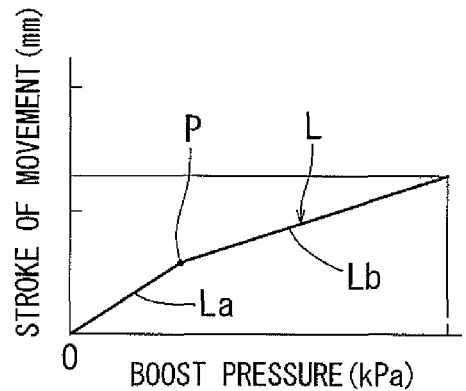
FIG. 5 is a characteristics chart illustrating the relationship between the boost pressure of the PCV valve and the movement stroke of the valve member.
Figure 6:
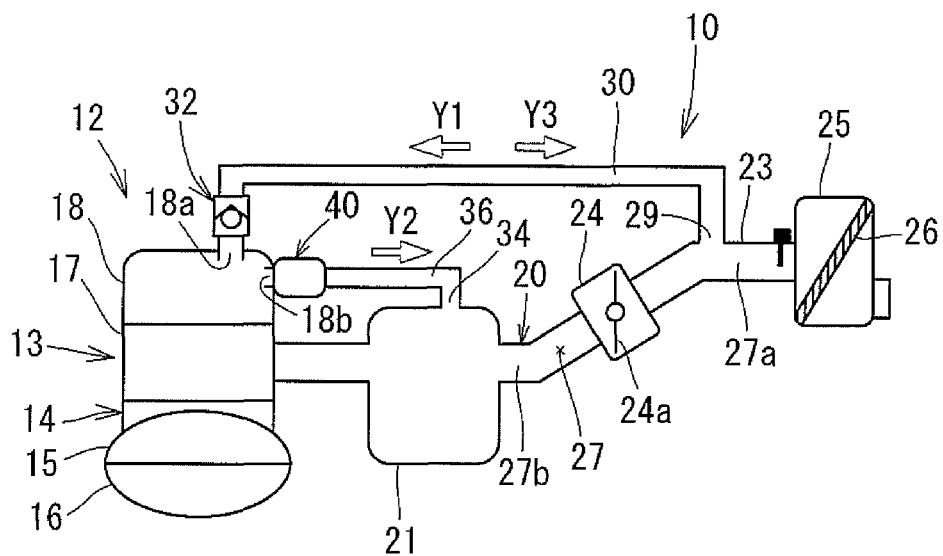
FIG. 6 is a diagram schematically illustrating a positive crankshaft ventilation system.

FIG. 5 is a graph illustrating a characteristic line L that shows the relationship between the boost pressure of the PCV valve 40 and the movement stroke (movement distance) of the valve member 46. As shown in FIG. 5, the characteristics line L has a changing point P of the boost pressure (intake negative pressure). The movement stroke of the valve member 46 per unit pressure of a characteristics line La when the boost pressure is not less than the changing point P is larger than the movement stroke of the valve member 46 per unit pressure of a characteristics line Lb when the boost pressure is less than the changing point P. That is, the first spring 67 acts from the initial position of the PCV valve 40 to the changing point P of the boost pressure (see characteristics line La). During this movement stroke, the second spring 69 may not act due to the gap S provided between the front end wall portion 58 of the housing 42 and the second spring 69. When the boost pressure is increased to a level not less than the changing point P, both the first and second springs 67 and 69 may act (see characteristics line Lb). During this movement stroke, the second spring 69 may act by coming into contact with the front end wall portion 58 of the housing 42. Thus, a spring device constituted by the first spring 67 and the second spring 69 may have a non-linear characteristic, in which the spring constant increases according to the movement distance of the valve member 46 from the initial position for the monitoring operation.

Figure 19:
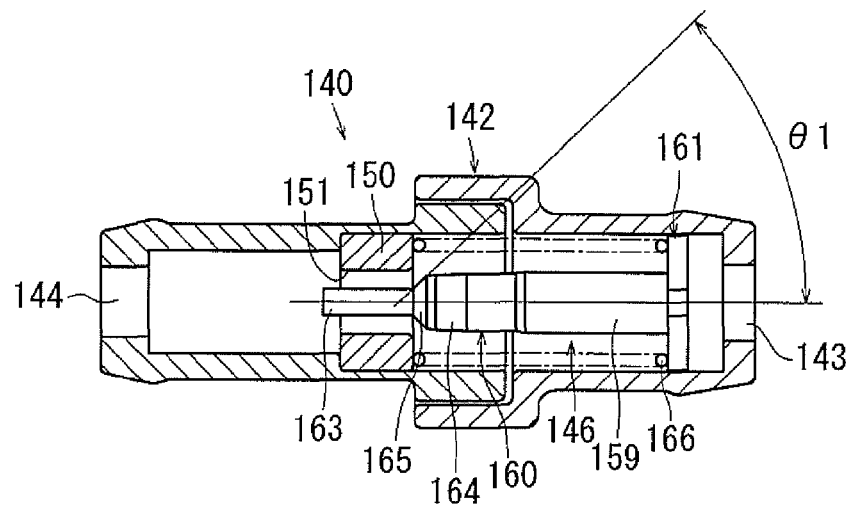
FIG. 19 is a sectional view illustrating a PCV valve according to conventional example 1.
Figure 20:
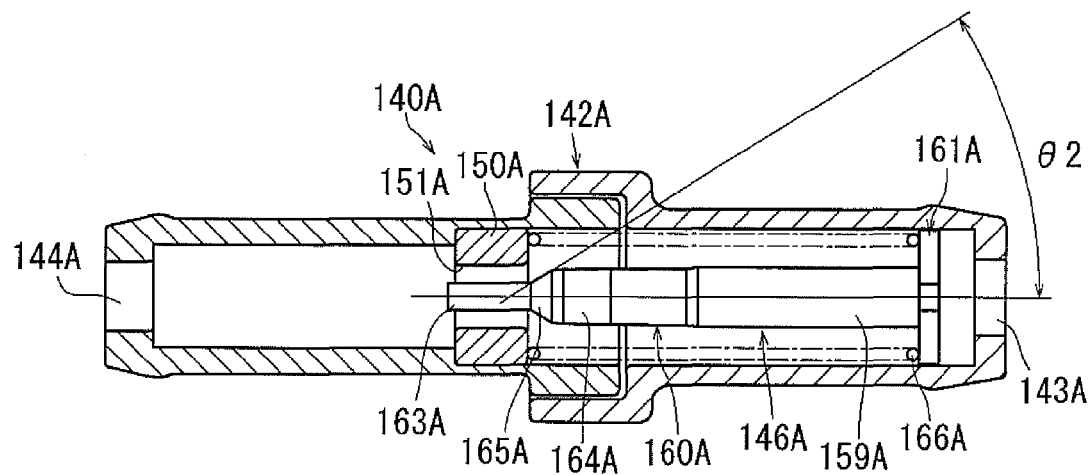
FIG. 20 is a sectional view illustrating a PCV valve according to conventional example 2.

In the present embodiment, the spring constant of the first spring 67 may be set to the same value as the spring constant of the spring 166A of conventional example 2 (see FIG. 20). Further, the spring constant of the second spring 69 may be set such that a spring constant which is the sum total of the spring constant of the first spring 67 and the spring constant of the second spring 69 is of the same value as the spring constant of the spring 166 of conventional example 1 (see FIG. 19). Further, the tapering angle θ of the tapered portion 65 of the monitoring shaft portion 60 of the valve member 46 may be set to the same value as the tapering angle θ2 of the tapered portion 165A of the valve member 146A of conventional example 2 (see FIG. 20). Further, the spring constant of the first spring 67 may be set to be smaller than the spring constant of the second spring 69.

Thus, the movement range in which the tapered portion 65 (inclusive of the small-diameter shaft portion 63) of the monitoring shaft portion 60 of the valve member 46 is positioned within the monitoring hole portion 51 of the housing 42, that is, the movement range in which the movement distance of the valve member 46 from the initial position for the monitoring operation is small. In other words, the movement range (stroke amount) corresponding to the WOT range of the engine 12, may be set to conform to that of conventional example 2 (see FIG. 20). Further, the movement range exclusive of the movement range in which the tapered portion 65 (inclusive of the small-diameter shaft portion 63) of the monitoring shaft portion 60 of the valve member 46 is positioned within the monitoring hole portion 51 of the housing 42. That is to say that the movement range in which the movement amount of the valve member 46 from the initial position for the monitoring operation is large. In other words, the movement range (stroke amount) corresponding to the partial range and idling range of the engine 12, may be set to conform to that of conventional example 1 (see FIG. 19).

Thus, in the movement range in which the tapered portion 65 (inclusive of the small-diameter shaft portion 63) of the monitoring shaft portion 60 of the valve member 46 is positioned within the monitoring hole portion 51 of the housing 42, the spring constant of the spring device (which is the spring constant of the first spring 67 in this movement range) may be set to be small. The tapering angle θ (see FIG. 4) may also be set to be small, whereby it is possible to suppress the self-excited oscillation of the valve member 46 thereby making it possible to stabilize the flow rate characteristic of the system. On the other hand, in the movement range exclusive of the movement range in which the tapered portion 65 (inclusive of the small-diameter shaft portion 63) of the monitoring shaft portion 60 of the valve member 46 is positioned within the monitoring hole portion 51 of the housing 42, the spring constant of the spring device (which is the sum total of the spring constants of the first spring 67 and of the second 69 in this movement range) may be set to be large. In this way, it is possible to suppress an increase in the axial length of the housing 42 and of the valve member 46 thereby making it possible to suppress an increase in the size of the PCV valve 40.

In this way, in the PCV valve 40 described above, a plurality of springs (the first spring 67 and the second spring 69) constituting the spring device biasing the valve member 46 toward the inlet port 43 are arranged such that the spring constant of the spring device changes within the movement range of the valve member 46 for the monitoring operation. In this way, it is possible to achieve an improvement in terms of degree of freedom in design.

Further, in the movement range in which the movement distance of the valve member 46 from the initial position for the monitoring operation is large, the first spring 67 and the second spring 69 may act, whereby it is possible to set the spring constant of the spring device (the sum total of the spring constant of the first spring 67 and that of the second spring 69) to be large. As a result, it is possible to suppress an increase in the axial length of the housing 42 and of the valve member 46, making it possible to suppress an increase in the size of the PCV valve 40. Further, in the movement range in which the movement distance from the initial position of the valve member 46 for the monitoring operation is small, solely the first spring 67 acts, whereby it is possible to set the spring constant of the spring device (the spring constant of the first spring 67) to be small.

Further, in the movement range in which only the first spring 67 acts, the tapering angle θ of the tapered portion 65 (see FIG. 4) may be set to be small, whereby it is possible to suppress the self-excited oscillation of the valve member 46. This makes it possible to stabilize the flow rate characteristic of the system.

Further, in the movement range in which the movement distance from the initial position of the valve member 46 for the monitoring operation exceeds the size of the gap S (see FIG. 1), the second spring 69 may move together with the valve member 46. Further, in the movement range in which the movement distance from the initial position of the valve member 46 for the monitoring operation is smaller than the gap S, the second spring 69 may not move together with the valve member 46.

Because the second spring 69 is connected with the valve member 46, the second spring 69 can move together with the valve member 46.

Other embodiments will now be described with reference to FIGS. 7 to 18. These embodiments are modifications of the PCV valve 40 according to the first embodiment described above. Therefore, in FIGS. 7 to 18, like members are given the same reference numerals as the first embodiment, and the description of the second to eighth embodiments will be focused on the differences from the first embodiment.

Figure 7:
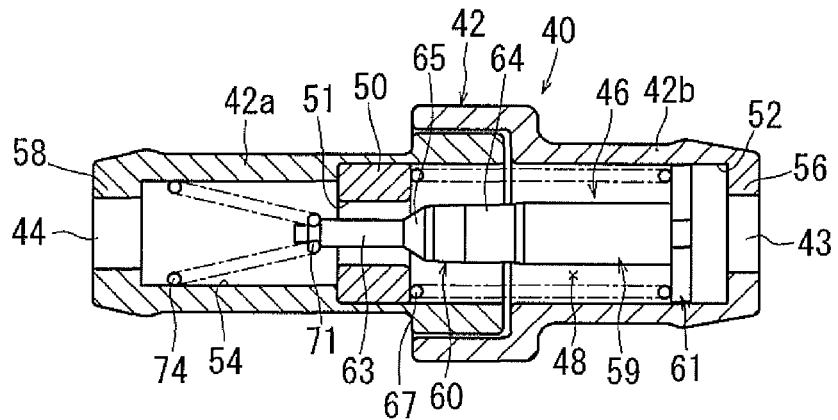
FIG. 7 is a sectional view illustrating a PCV valve according to an embodiment in accordance with the principles disclosed herein.
Figure 8:
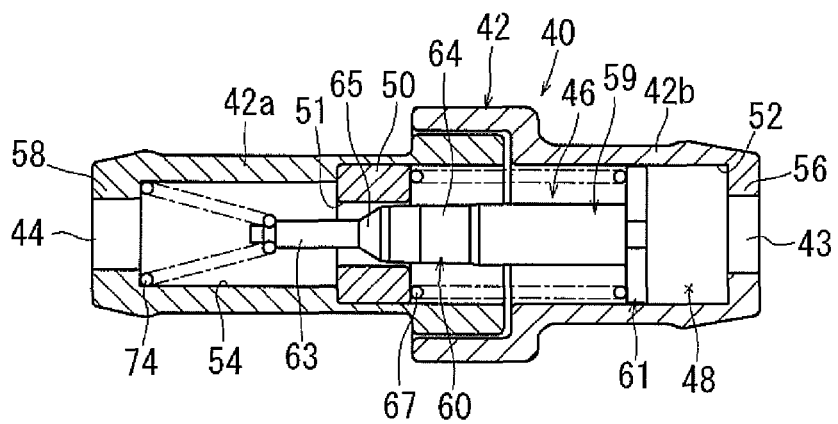
FIG. 8 is a sectional view illustrating the PCV valve of FIG. 7, with its first and second springs in a state of action.

Another embodiment will now be described with reference to FIGS. 7 and 8. As shown in FIGS. 7 and 8, in the present embodiment, the second spring 69 of the first embodiment (see FIG. 1) is replaced by a second spring 74. The second spring 74 may be a conical tubular coil spring. The small-diameter side terminal portion of the second spring 74 may be attached to the mounting groove 71 of the valve member 46 by utilizing the elastic deformation thereof.

Figure 9:
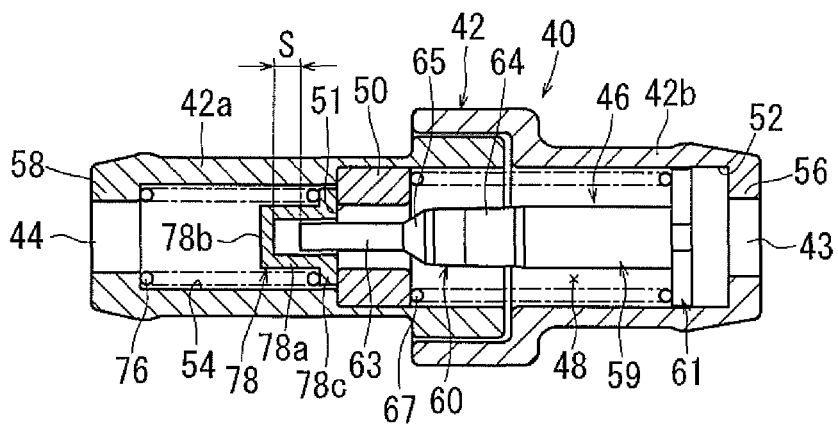
FIG. 9 is a sectional view illustrating a PCV valve according to an embodiment in accordance with the principles disclosed herein.
Figure 10:
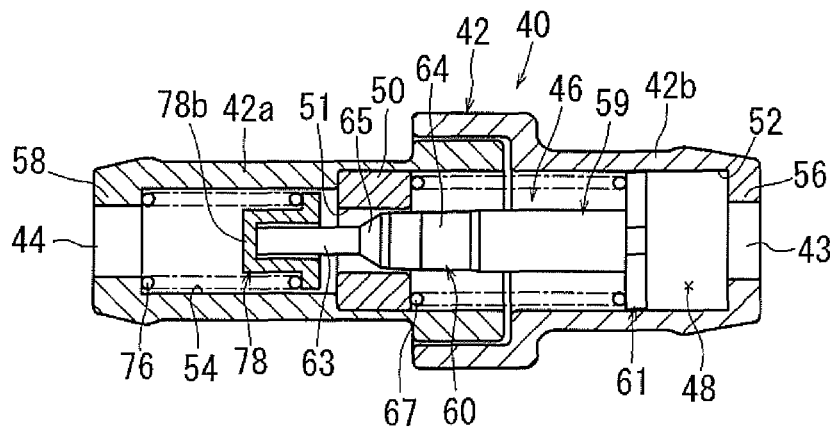
FIG. 10 is a sectional view illustrating the PCV valve of FIG. 9, with its first and second springs in a state of action.

Another embodiment will now be described with reference to FIGS. 9 and 10. As shown in FIGS. 9 and 10, in the present embodiment, the second spring 69 of the first embodiment (see FIG. 1) is replaced by a second spring 76. The second spring 76 may be a cylindrical coil spring having no pigtail end portion 69a. An interlock member 78 may be axially movably disposed between the seat 50 of the housing 42 and the second spring 76. The interlock member 78 may have a cylindrical tubular portion 78a extending in the axial direction of the valve member 46, an end plate portion 78b closing the front end opening of the tubular portion 78a, and a flange 78c protruding radially outward from the rear end of the tubular portion 78a (see FIG. 9). The second spring 76 may be interposed between the front end wall portion 58 of the housing 42 and the flange 78c of the interlock member 78 (see FIG. 9).

In this embodiment, the mounting groove 71 (see FIG. 1) of the valve member 46 of the first embodiment (see FIG. 1) is omitted. Instead, the leading end portion of the small-diameter shaft portion 63 of the monitoring shaft portion 60 of the valve member 46 is axially movably fitted over the tubular portion 78a of the interlock member 78. The small-diameter shaft portion 63 of the valve member 46 and the tubular portion 78a of the interlock member 78 are loosely fitted with each other, forming a flow passage for the flow of blow-by gas between the valve member 46 and the interlock member 78. Further, the tubular portion 78a of the interlock member 78 may have at least one ventilation hole (not shown) through which blow-by gas can flow. Further, the gap S (see FIG. 9) is formed between the small-diameter shaft portion 63 of the valve member 46 and the end plate portion 78b of the interlock member 78.

In the present embodiment, in the movement range in which the movement distance from the initial position of the valve member 46 for the monitoring operation exceeds the size of the gap S (see FIG. 9), the second spring 76 may move together with the valve member 46 via the interlock member 78 (see FIG. 10). Further, in the movement range in which the movement distance from the initial position of the valve member 46 for the monitoring operation is smaller than the gap S, the second spring 76 may not move together with the valve member 46 (see FIG. 9).

Figure 11:
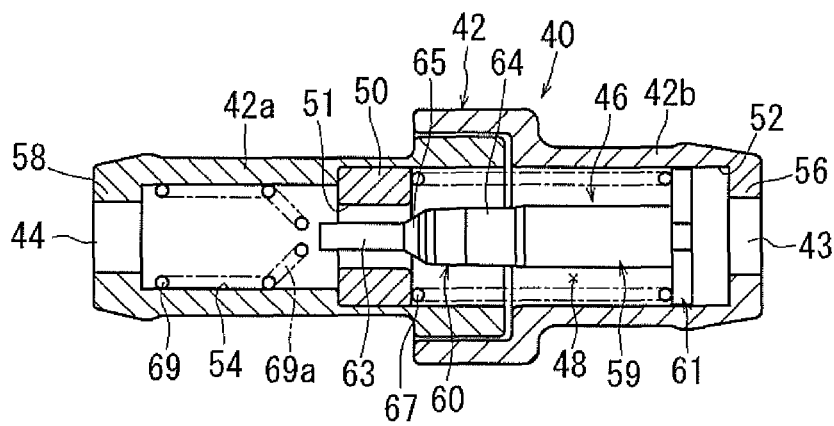
FIG. 11 is a sectional view illustrating a PCV valve according to an embodiment in accordance with the principles disclosed herein.
Figure 12:
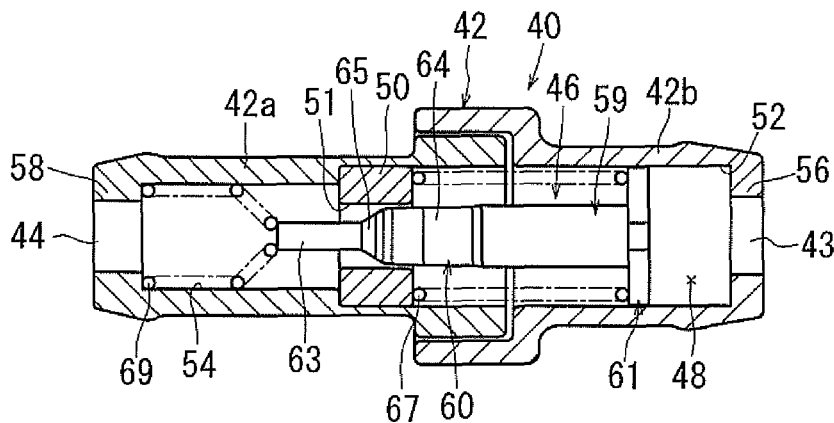
FIG. 12 is a sectional view illustrating the PCV valve of FIG. 11, with its first and second springs in a state of action.

Another embodiment will now be described with reference to FIGS. 11 and 12. As shown in FIGS. 11 and 12, in the present embodiment, the mounting groove 71 (see FIG. 1) of the valve member 46 of the first embodiment (see FIG. 1) is omitted, and the pigtail end portion 69a (see FIG. 1) of the second spring 69 is not connected to the valve member 46. Instead, the small-diameter side terminal portion of the pigtail end portion 69a and the small-diameter shaft portion 63 of the valve member 46 are opposed to each other in the axial direction so as to be capable of moving towards and away from each other in the axial direction.

According to the present embodiment, the second spring 69 may act with the valve member 46 (see FIG. 12) in the movement range in which the movement distance from the initial position of the valve member 46 for the monitoring operation exceeds the size of the gap S (see FIG. 1). On the other hand, in the movement range in which the movement distance from the initial position of the valve member 46 for the monitoring operation is smaller than the size of the gap S (see FIG. 1), the second spring 69 may not act with the valve member 46 (see FIG. 11).

Figure 13:
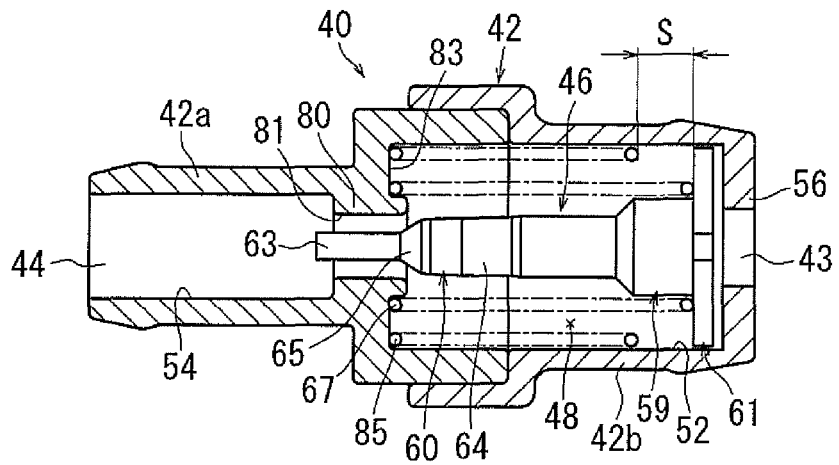
FIG. 13 is a sectional view illustrating a PCV valve according to an embodiment in accordance with the principles disclosed herein.
Figure 14:
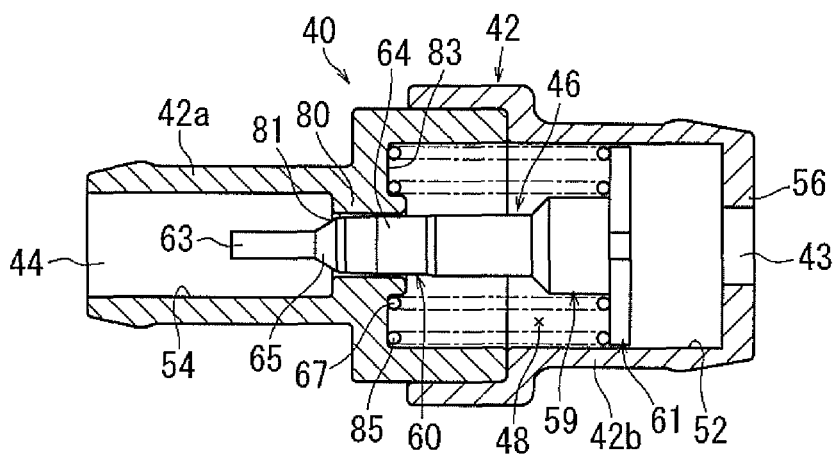
FIG. 14 is a sectional view illustrating the PCV valve of FIG. 13, with its first and second springs in a state of action.

Another embodiment will be described with reference to FIGS. 13 and 14. As shown in FIGS. 13 and 14, in this embodiment, the seat 50 of the housing 42 and the front end wall portion 58 of the first embodiment (see FIG. 1) are omitted. Instead of the seat 50, a hollow cylindrical seat portion 80 having a reduced inner diameter is coaxially formed with the central portion of the front side housing half 42a of the housing 42. The hole of the seat portion 80 may serve as a monitoring hole portion (indicated by numeral 81). An annular spring seat surface 83 may be formed on the wall surface on side of the inlet port 43 of the seat portion 80. Further, the first spring 67 and a second spring (indicated by numeral 85) are coaxially arranged so as to be positioned radially inside and outside. The second spring 85 may be a cylindrical coil spring. Both springs 67 and 85 are disposed between the spring seat surface 83 of the housing 42 and the surface of the guide portion 61 of the valve member 46 opposed thereto in the axial direction. Further, the gap S (see FIG. 13) may be formed between the second spring 85 and the guide portion 61 of the valve member 46. As a result of the arrangement of the two springs 67 and 85, the upstream side passage wall surface 52 of the rear side housing half 42*b* may have a diameter larger than that in the first embodiment. Also, the guide portion 61 of the valve member 46 and the base shaft portion 59 may have diameters that are larger than those in the embodiment shown in FIGS. 1 and 2.

According to the embodiment shown in FIGS. 13 and 14, the second spring 85 may act with the valve member 46 (see FIG. 14) in the movement range in which the movement distance from the initial position of the valve member 46 for the monitoring operation exceeds the size of the gap S (see FIG. 13). On the other hand, in the movement range in which the movement distance from the initial position of the valve member 46 for the monitoring operation is smaller than the gap S, the second spring 85 may not act with the valve member 46 (see FIG. 13).

Figure 15:
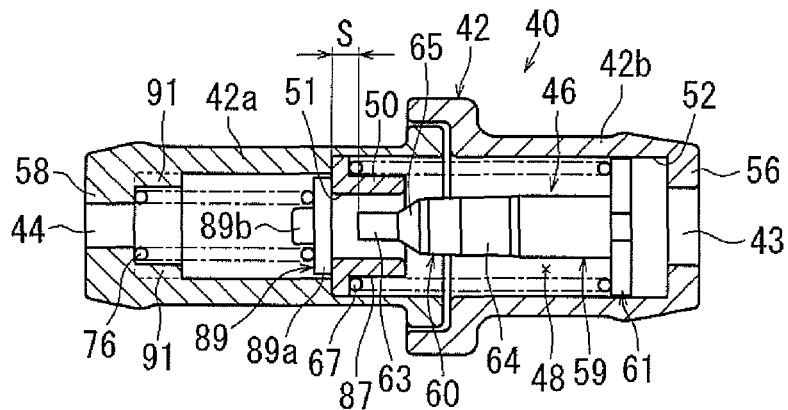
FIG. 15 is a sectional view illustrating a PCV valve according to an embodiment in accordance with the principles disclosed herein.
Figure 16:
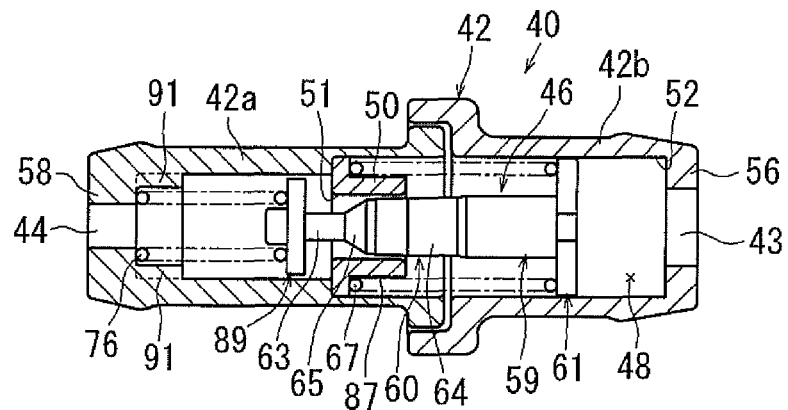
FIG. 16 is a sectional view illustrating the PCV valve of FIG. 15, with its first and second springs in a state of action.

Another embodiment will be described with reference to FIGS. 15 and 16. As shown in FIGS. 15 and 16, in this embodiment, the seat 50 and the front end wall portion 58 of the housing 42 of the third embodiment (see FIG. 9) are modified. A stepped recess 87 may be formed in the outer peripheral portion of the seat 50 of the third embodiment (See FIG. 9), so that the seat 50 has a small outer diameter portion and a large diameter portion, respectively, disposed on the side of the inlet port 43 and the side opposite thereto. The front end surface of the first spring 67 may contact the stepped surface of the stepped recess 87. An interlock member 89 may replace the interlock member 78. The interlock member 89 may have a disc-like base plate portion 89*a* and a guide shaft 89*b* having the same axis as the base plate portion 89*a* and protruding from the front surface of the base plate portion 89*a* (see FIG. 15). The interlock member 89 may have at least one ventilation hole (not shown) through which blow-by gas can flow.

The second spring 76 may be disposed between the front end wall portion 58 of the housing 42 and the base plate portion 89*a* of the interlock member 78 (see FIG. 15). The rear end portion of the second spring 76 may be fitted on the guide shaft 89 of the interlock member 89. The second spring 76 may have a smaller diameter than that of the third embodiment (see FIG. 9). In this connection, at the corner portion formed between the front end wall portion 58 and the downstream side passage wall surface 54 of the front side housing half 42*a* of the housing 42, a plurality of rib-like guide protrusions 91 may be formed at equal intervals in the circumferential direction so as to be fit-engaged with the front end portion of the second spring 76. Further, the small-diameter shaft portion 63 of the valve member 46 may be shorter than that in the embodiment shown in FIGS. 9 and 10, whereby the gap S may be formed between the small-diameter portion 63 of the valve member 46 and the base plate portion 89*a* of the interlock member 89 (see FIG. 15). Further, the base shaft portion 59 of the valve member 46 may be also shorter than that in the embodiment shown in FIGS. 9 and 10.

With the embodiment shown in FIGS. 15 and 16, it is possible to shorten the axial length of the housing 42 and that of the valve member 46 as compared with those of the third embodiment. Further, it is possible to shorten the spring length (axial length) of the two springs 67 and 76. Thus, it is possible to reduce the size of the PCV valve 40, and to easily mold the two housing halves 42*a* and 42*b* and the valve member 46.

Figure 17:
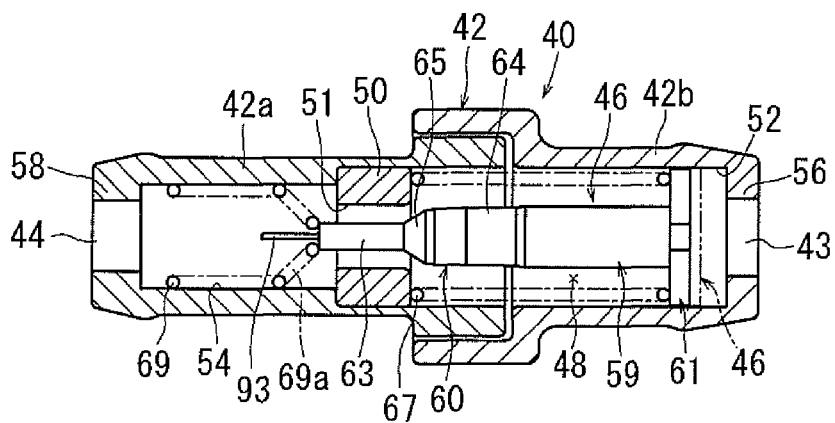
FIG. 17 is a sectional view illustrating a PCV valve according to an embodiment in accordance with the principles disclosed herein.

Another embodiment will be described with reference to FIG. 17. As shown in FIG. 17, in this embodiment, a mounting shaft portion 93 is formed at the leading end portion of the small-diameter shaft portion 63 of the measurement shaft portion 60 of the valve member 46 of the first embodiment (See FIG. 1). The mounting shaft portion 93 may have the same axis as the small-diameter shaft portion 63 and have an outer diameter smaller than that of the small-diameter shaft portion 63. In addition, the outer diameter of the mounting shaft portion 93 may be smaller than the inner diameter of the small-diameter side terminal portion of the pigtail end portion 69*a* of the second spring 69. The mounting shaft portion 93 may be axially movably inserted into the small-diameter side terminal portion of the pigtail end portion 69*a* of the second spring 69. Thus, it is only necessary to insert the mounting shaft portion 93 into the small-diameter side terminal portion of the pigtail end portion 69*a* of the second spring 69, making it possible to achieve an improvement in terms of ease in assembling the valve member 46 and the second spring 69. While the mounting shaft portion 93 of the valve member 46 is axially movable with respect to the pigtail end portion 69*a* of the second spring 69, the length of the mounting shaft portion 93 is configured such that there is no concern that the pigtail end portion 69*a* could be detached from the mounting shaft portion 93.

Figure 18:
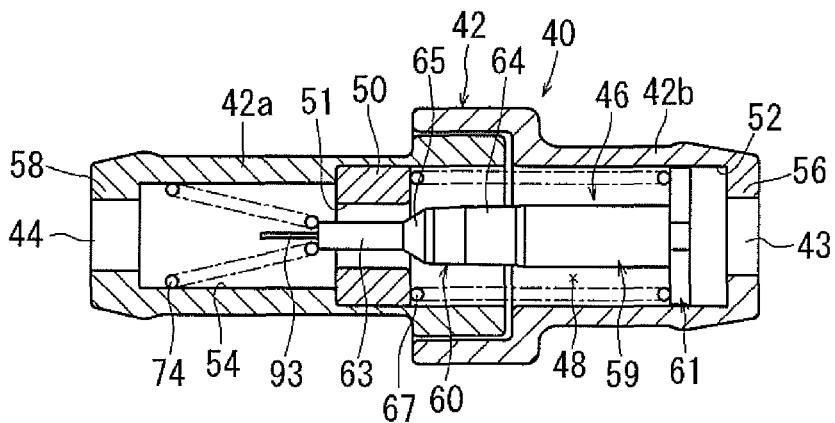
FIG. 18 is a sectional view illustrating a PCV valve according to an embodiment in accordance with the principles disclosed herein.

Another embodiment will be described with reference to FIG. 18. As shown in FIG. 18, in this embodiment, the second spring 69 of the seventh embodiment (See FIG. 17) is replaced by the second spring 74 of the second embodiment. This second spring 74 is a conical tubular spring (see FIG. 7). The mounting shaft portion 93 is axially movably inserted into the small-diameter side terminal portion of the second spring 74.

The above embodiments may be modified in various ways. For example, the present invention is applicable not only to PCV valves but also to any other flow control valves used for controlling the flow rate of fluids other than blow-by gas. Further, the method in which the spring constant of the spring device changes may be chosen in any suitable manner. Further, the number of the plurality of springs of the spring device may not be limited to two (i.e., the first spring 67 and the second spring 69) but may be three or more. Further, while in the above embodiments the first spring 67 is set to have a smaller spring constant than that of the second spring 69, it is also possible to set the spring constant of the first spring 67 to be larger than that of the second spring 69. It is also contemplated that the two springs 67 and 69 may have the same or substantially the same spring constant. Further, at least one of the two springs 67 and 69 may be replaced by one having a non-linear characteristic. Further, at least one of the first spring 67 and the second spring 69 may include a plurality of coil springs. Further, the material of the housing 42 and/or the valve member 46 may not be restricted to resin but may be constructed wholly or partially of metal.

What is claimed is:

1. A flow control valve comprising:
 a housing having an inlet port and an outlet port;
 a valve member movable in an axial direction within the housing;

a spring device configured to bias the valve member in the axial direction toward the inlet port; and a monitoring hole portion disposed within the housing; wherein:

the valve member includes a base shaft portion and a monitoring shaft portion;

with the monitoring shaft portion positioned within the monitoring hole portion, the valve member moves in the axial direction within the housing in response to a difference in pressure between an upstream side and a downstream side of the valve member within the housing in order to monitor a flow rate of a fluid flowing from the inlet port to the outlet port;

the spring device comprising a plurality of springs, the plurality of springs being configured such that a spring constant of the spring device changes within a movement range of the valve member during a monitoring operation;

the spring constant of the spring device has a non-linear characteristic whereby the spring constant increases from an initial position in accordance with a movement distance of the valve member during the monitoring operation; and the plurality of springs comprise a first spring second spring;

the first spring is interposed between the housing and the valve member and is arranged at an upstream side position within the housing, the first spring configured to bias the valve member throughout the entire movement range of the valve member during the monitoring operation; and the second spring is arranged at a downstream side position within the housing and connected to the valve member so as to be movable together with the valve member within the housing, while a gap is formed between the second spring and the housing when the valve member is positioned at the initial position;

the second spring is configured to bias the valve member when the valve member is in a first part of the movement range during the monitoring operation, where a moving distance of the valve member from the initial position is greater than a length of the gap in the axial direction; and the second spring is configured to not bias the valve member when the valve member is in a second part of the movement range for the monitoring operation, where the moving distance of the valve member from the initial position is less than the length of the gap.

2. The flow control valve according to claim 1, wherein:

the monitoring shaft portion of the valve member includes a tapered portion and a small diameter shaft portion disposed more proximate to the outlet port than the tapered portion;

tapered portion is positioned within the monitoring hole portion when the valve member is in a part of the movement range where the first spring member biases the valve member but the second spring member does not bias the valve member;

at least a part of the small-diameter shaft portion is positioned within the monitoring hole portion throughout the movement range of the valve member;

the tapered portion has a first end proximate the inlet port and a second end proximate the outlet port;

a diameter of the first end is larger than a diameter of the second end;

the small-diameter shaft portion is connected to the second end of the tapered portion and has a diameter and an axial length, the diameter of the small-diameter shaft portion being substantially uniform through the axial length and being substantially equal to the diameter of the second end of the tapered portion; and the second spring is connected to an end portion of the small-diameter shaft portion on a side of the outlet port.

3. The flow control valve according to claim 1, wherein a spring constant of the first spring is smaller than a spring constant of the second spring.

4. The flow control valve according to claim 1, wherein each of the first spring and the second spring is a single coil spring.

5. The flow control valve according to claim 1, wherein the flow control valve is a PCV valve used in a blow-by gas refluxing system of an internal combustion engine.

6. The flow control valve according to claim 1, wherein:

an annular mounting groove is formed in an end portion of the valve member on a side of the outlet port; and an end portion of the second spring on a side of the valve member is seated in the annular mounting groove.

7. A flow control valve, comprising:

a housing having an inlet portion and an outlet portion;

a valve member movably in an axial direction within the housing;

a spring device configured to bias the valve member in the axial direction toward the inlet port; and a monitoring hole portion disposed in the housing;

wherein:

the valve member includes a base shaft portion and a monitoring shaft portion;

with the monitoring shaft portion positioned within the monitoring hole portion, the valve member moves in the axial direction within the housing in response to a different in pressure between an upstream side and a downstream side of the valve member within the housing in order to monitor a flow rate of a fluid flowing from the inlet port to the outlet port;

the spring device comprises a plurality of springs;

the plurality of springs is configured such that a spring constant of the spring devices changes within a movement range of the valve member during a monitoring operation;

the spring constant of the spring device has a non-linear characteristic whereby the spring contact increases from an initial position in accordance with movement of the valve member during the monitoring operation;

the plurality of springs comprises a first spring and a second spring;

the first spring is configured to bias the valve member throughout the entire movement range of the valve member during the monitoring operation;

the second spring is configured to bias the valve member throughout only fraction of the movement range of the valve member during the monitoring operation;

the first spring is interposed between the housing and the valve member;

the first spring is arranged at an upstream side portion within the housing;

an interlock member is disposed on a downstream side within the housing so as to be movable in the axial direction;

the second spring is interposed between the housing and the interlock member;

a gap is formed between the valve member and the interlock member when the valve member is positioned at the initial position during the monitoring operation;

the second spring is configured to bias the valve member via the interlock member when the valve member is in a first part of the movement range during the monitoring operation, wherein the movement distance of the valve member from the initial position is greater than a length of the gap in the axial direction; and the second spring is configured to not bias the valve member via the interlock member when the valve member is in a second part of the movement range during the monitoring operation, where the moving distance of the valve member from the initial position is less than the length of the gap.

* * * * *